United States Patent
Sadek et al.

(10) Patent No.: US 8,964,718 B2
(45) Date of Patent: Feb. 24, 2015

(54) DETECTING BURSTY INTERFERENCE TO TRIGGER A COEXISTENCE INDICATION

(71) Applicant: QUALCOMM Incorporated, San Diego, CA (US)

(72) Inventors: Ahmed K. Sadek, San Diego, CA (US); Pranav Dayal, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 13/727,396

(22) Filed: Dec. 26, 2012

(65) Prior Publication Data

US 2013/0176877 A1 Jul. 11, 2013

Related U.S. Application Data

(60) Provisional application No. 61/583,582, filed on Jan. 5, 2012, provisional application No. 61/667,781, filed on Jul. 3, 2012.

(51) Int. Cl.
- *H04J 1/00* (2006.01)
- *H04W 24/02* (2009.01)
- *H04W 16/14* (2009.01)
- *H04W 88/06* (2009.01)

(52) U.S. Cl.
CPC .............. *H04W 24/02* (2013.01); *H04W 16/14* (2013.01); *H04W 88/06* (2013.01)
USPC .......................................... 370/343; 370/252

(58) Field of Classification Search
CPC .............. H04J 3/10; H04J 1/12; H04B 3/464; H04B 17/003; H04Q 2011/0049; H04W 24/00; H04L 43/50; H04L 3/0852; H04L 43/08
USPC ........... 370/252, 241, 229, 230, 201, 201.343
See application file for complete search history.

(56) References Cited

U.S. PATENT DOCUMENTS

| | | |
|---|---|---|
| 2009/0003427 A1 | 1/2009 | Yan et al. |
| 2010/0225302 A1* | 9/2010 | Tsuda .................... 324/76.24 |

(Continued)

OTHER PUBLICATIONS

3rd Generation Partnership Project, Technical Specification Group Radio Access Network, Evolved Universal Terrestrial Radio Access (E-UTRA), Study on signalling and procedure for interference avoidance, for in-device coexistence (Release 11), Dec. 2011.

(Continued)

*Primary Examiner* — Dady Chery
(74) *Attorney, Agent, or Firm* — Seyfarth Shaw LLP

(57) ABSTRACT

A user equipment (UE) may reduce coexistence issues with one or more radio access technologies (RATs) caused by a bursty interference. The bursty interference may be detected by detecting a number of modes in a measured signal sample and determining when a signal contains a multi-modal distribution based at least in part on the detecting. A coexistence indication is created based at least in part on the determining.

28 Claims, 11 Drawing Sheets

(56) References Cited

U.S. PATENT DOCUMENTS

| | | |
|---|---|---|
| 2010/0284381 A1 | 11/2010 | Hirsch |
| 2011/0075604 A1 | 3/2011 | Fong et al. |
| 2011/0243047 A1 | 10/2011 | Dayal et al. |
| 2011/0256834 A1* | 10/2011 | Dayal et al. ............ 455/67.7 |
| 2011/0267966 A1 | 11/2011 | Gao et al. |
| 2012/0014482 A1 | 1/2012 | Yu et al. |
| 2012/0020229 A1 | 1/2012 | Dayal et al. |

OTHER PUBLICATIONS

International Search Report and Written Opinion—PCT/US2012/071779—ISA/EPO—Apr. 5, 2013.

Mediatek, "Trigger of In-Device Coexistence Indication", 3GPP Draft, R2-115229 Trigger of IDC Indication, 3rd Generation Partnership Project (3GPP), Mobile Competence Centre, 650, Route des Lucioles, F-06921 Sophia-Antipolis Cedex, France, vol. RAN WG2, No. Zhuhai, Oct. 4, 2011, XP050541003.

* cited by examiner

DETECTING BURSTY INTERFERENCE TO TRIGGER A COEXISTENCE INDICATION

CROSS REFERENCE TO RELATED APPLICATION

This application is related to U.S. provisional patent application No. 61/583,582, filed Jan. 5, 2012 in the names of SADEK et al., and U.S. provisional patent application No. 61/667,781, filed Jul. 3, 2012 in the names of SADEK et al., the disclosures of which re expressly incorporated herein by reference in their entireties.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith. It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

According to one aspect of the present disclosure, a method for wireless communication includes detecting a number of modes in a measured signal sample. The method may also include determining when a signal contains a multi-modal distribution based at least in part on the detecting. The method may also include creating a coexistence indication based at least in part on the determining.

According to another aspect of the present disclosure, an apparatus for wireless communication includes means for detecting a number of modes in a measured signal sample. The apparatus may also include means for determining when a signal contains a multi-modal distribution based at least in part on the detecting. The apparatus may also include means for creating a coexistence indication based at least in part on the determining.

According to one aspect of the present disclosure, a computer program product for wireless communication in a wireless network includes a computer readable medium having non-transitory program code recorded thereon. The program code includes program code to detect a number of modes in a measured signal sample. The program code also includes program code to determine when a signal contains a multi-modal distribution based at least in part on the detecting. The program code also includes program code to create a coexistence indication based at least in part on the determining.

According to one aspect of the present disclosure, an apparatus for wireless communication includes a memory and a processor(s) coupled to the memory. The processor(s) is configured to detect a number of modes in a measured signal sample. The processor(s) is further configured to determine when a signal contains a multi-modal distribution based at least in part on the detecting. The processor(s) is further configured to create a coexistence indication based at least in part on the determining.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). In certain circumstances, bursty interference may cause coexistence issues with one or more radio access technologies (RATs). When such bursty interference is detected, a coexistence indication may be sent to a coexistence manager or base station to manage the coexistence issues. To detect bursty interference, a UE may analyze a measured signal to identify a multi-modal distribution, which may trigger a coexistence indication.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Figure 1:
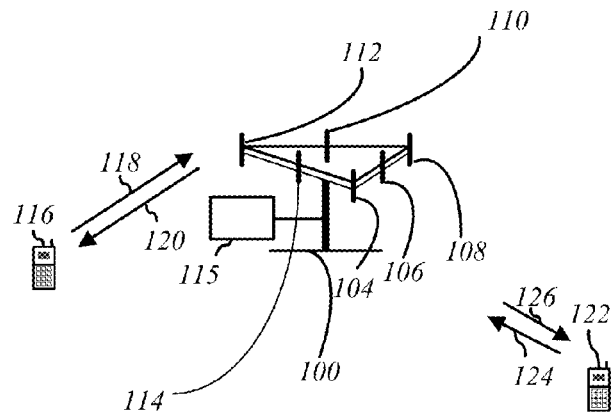
FIG. 1 illustrates a multiple access wireless communication system according to one aspect.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
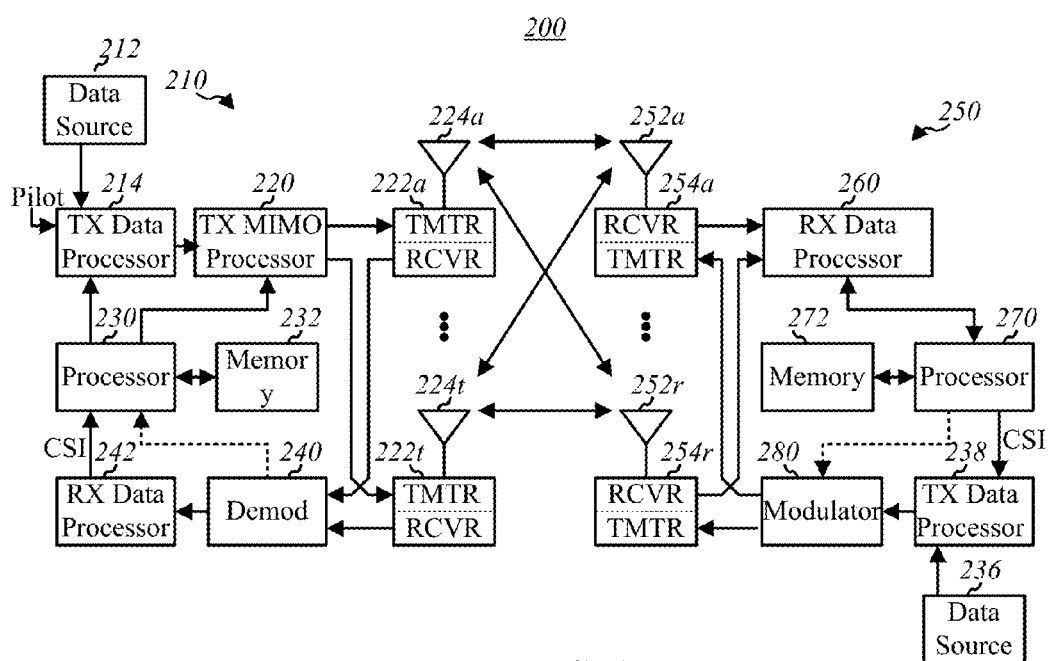
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, wherein NS≤min{NT, NR}. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides NT modulation symbol streams to NT transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from the transmitters 222a through 222t are then transmitted from NT antennas 224a through 224t, respectively.

At a receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NR "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
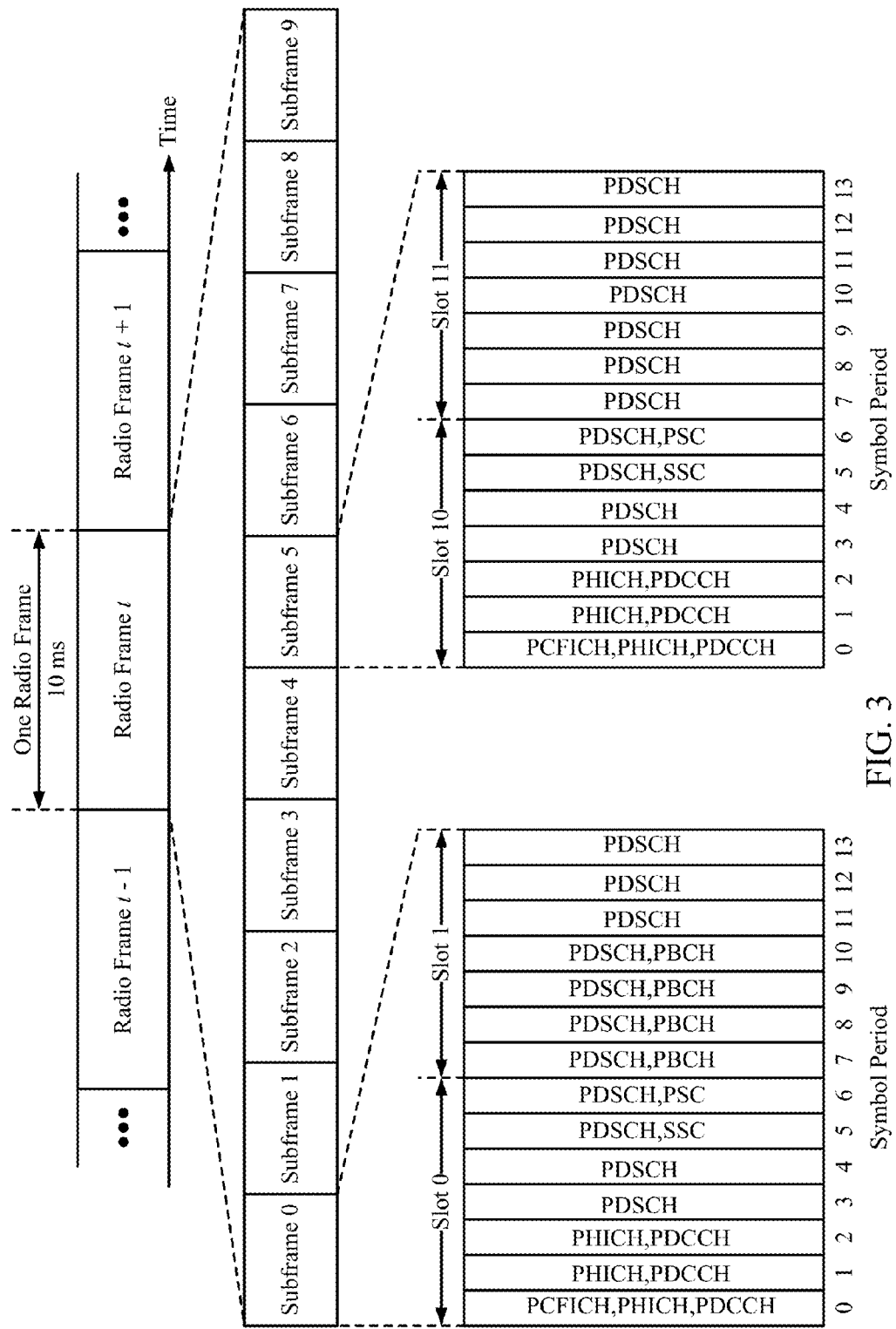
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
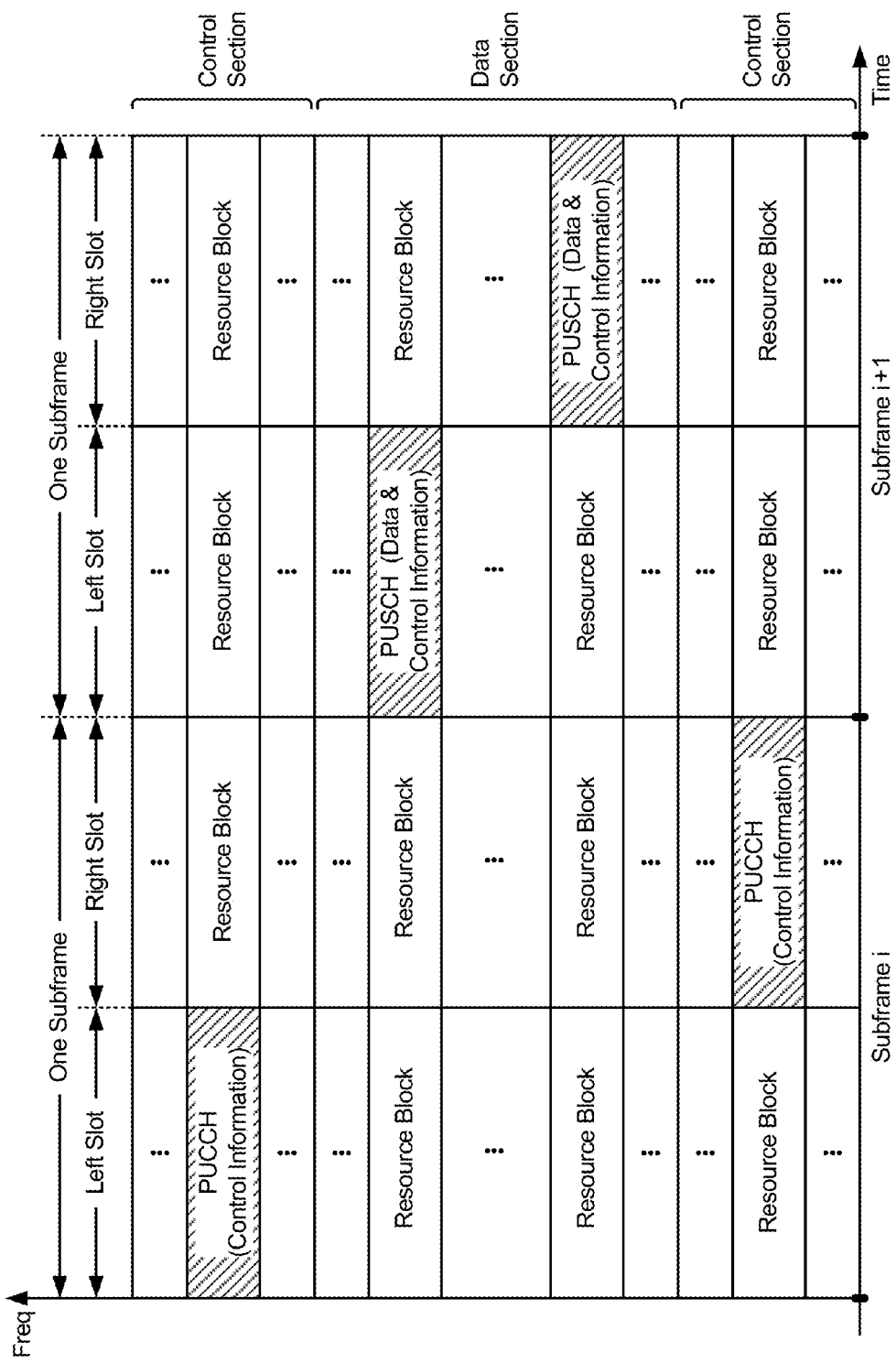
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
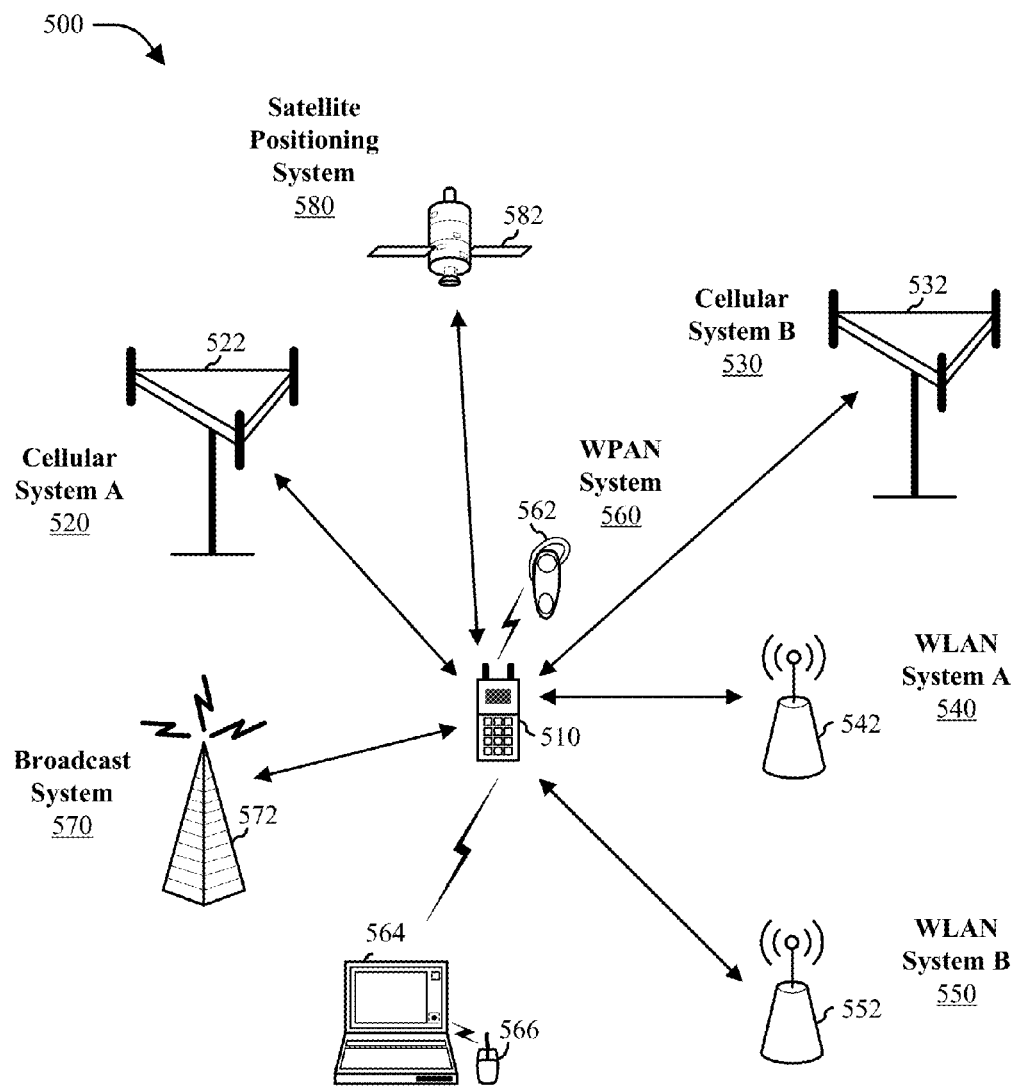
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (C×M, not shown) that has a functional module to detect and mitigate coexistence issues, as explained further below.

Figure 6:
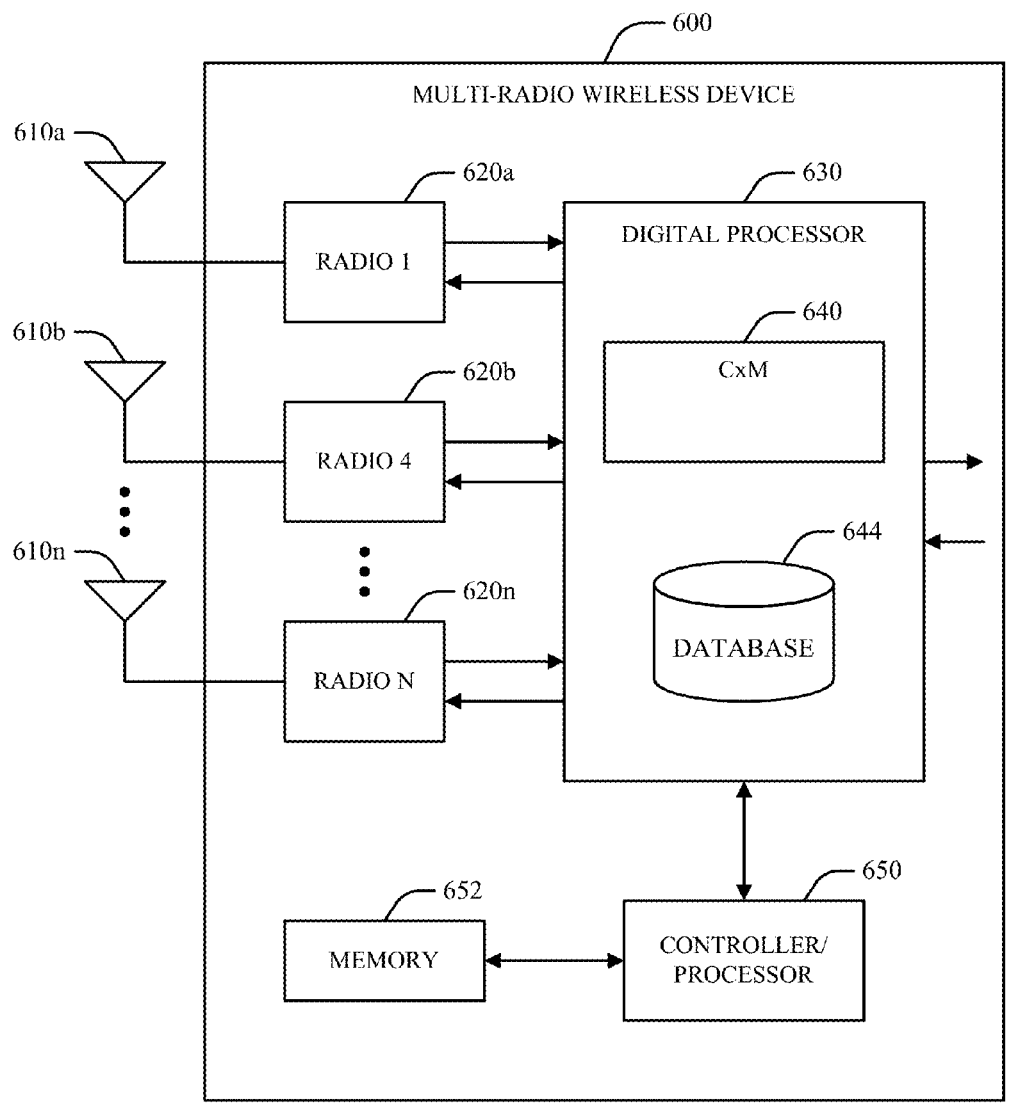
FIG. 6 is a block diagram of an example design for a multi-radio wireless device.

Turning next to FIG. 6, a block diagram is provided that illustrates an example design for a multi-radio wireless device 600 and may be used as an implementation of the device 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a coexistence manager (C×M) 640 that can control operation of the radios 620 in order to improve the performance of the wireless device 600 as generally described herein. The C×M 640 can have access to a database 644, which can store information used to control the operation of the radios 620. As explained further below, the C×M 640 can be adapted for a variety of techniques to decrease interference between the radios. In one example, the C×M 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
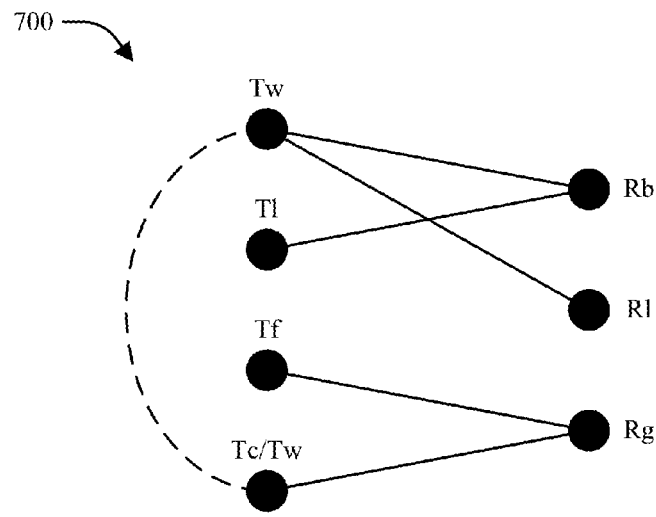
FIG. 7 is graph showing respective potential collisions between seven example radios in a given decision period.

In an aspect, the C×M 640 can manage operation of respective radios 620 utilized by wireless device 600 in order to avoid interference and/or other performance degradation associated with collisions between respective radios 620. C×M 640 may perform one or more processes, such as those illustrated in FIGS. 11 and 13. By way of further illustration, a graph 700 in FIG. 7 represents respective potential collisions between seven example radios in a given decision period. In the example shown in graph 700, the seven radios include a WLAN transmitter (Tw), an LTE transmitter (T1), an FM transmitter (Tf), a GSM/WCDMA transmitter (Tc/Tw), an LTE receiver (R1), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (T1) and the Bluetooth receiver (Rb); (3) the WLAN transmitter (Tw) and the LTE receiver (R1); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
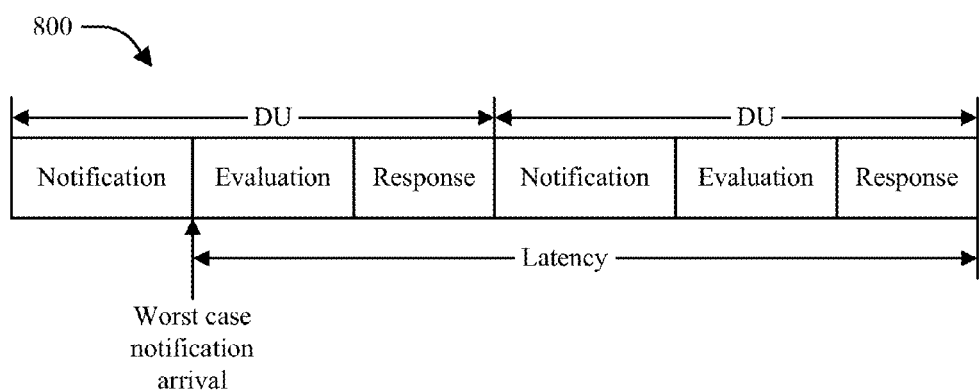
FIG. 8 is a diagram showing operation of an example Coexistence Manager (CxM) over time.

In one aspect, an example C×M 640 can operate in time in a manner such as that shown by diagram 800 in FIG. 8. As diagram 800 illustrates, a timeline for C×M operation can be divided into Decision Units (DUs), which can be any suitable uniform or non-uniform length (e.g., 100 μs) where notifications are processed, and a response phase (e.g., 20 μs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
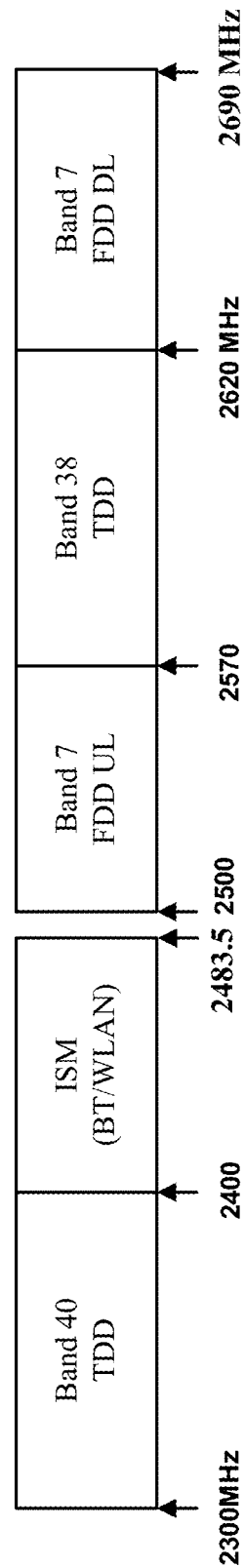
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Figure 10:
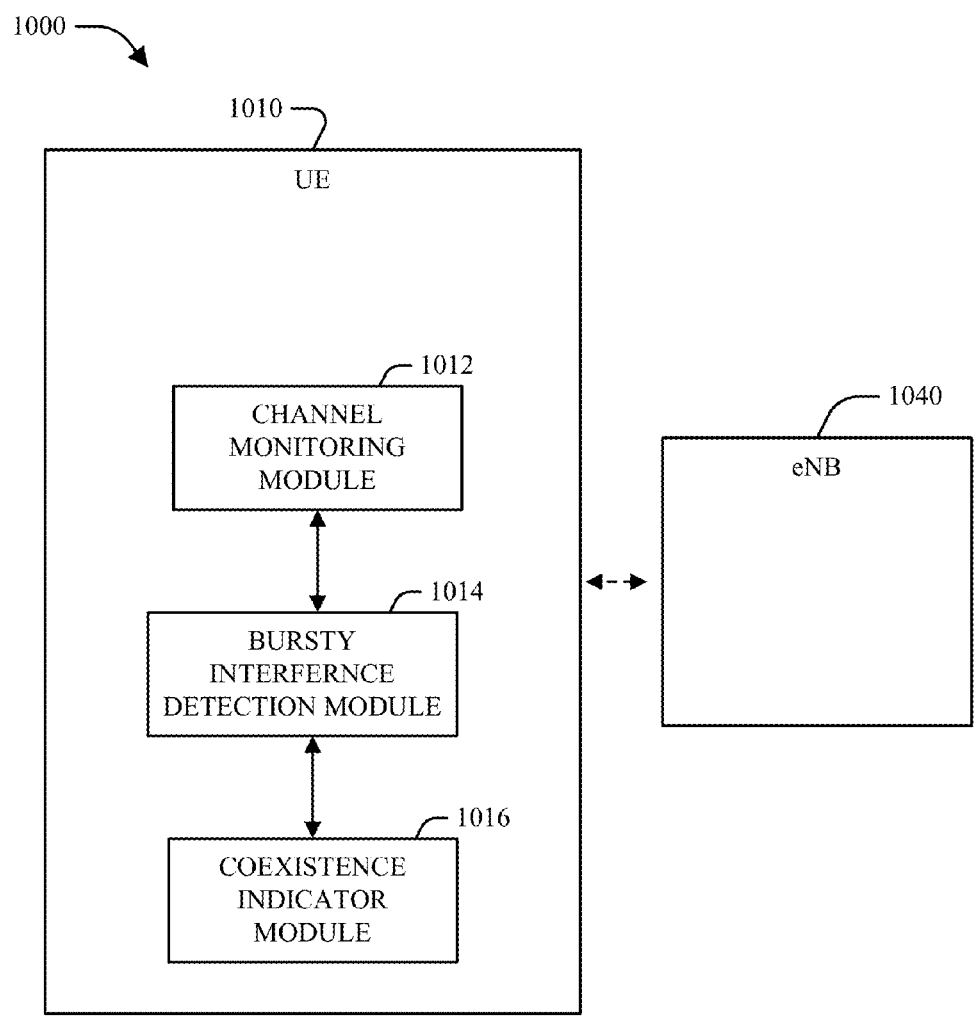
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and/or eNBs 1040, which can engage in uplink and/or downlink communications, and/or any other suitable communication with each other and/or any other entities in the system 1000. In one example, the UE 1010 and/or eNB 1040 can be operable to communicate using a variety resources, including frequency channels and sub-bands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the above shortcomings, the UE 1010 can utilize respective features described and illustrated by the system 1000 to facilitate support for multi-radio coexistence within the UE 1010. For example, a channel monitoring module 1012, a bursty interference detection module 1014, and a coexistence indicator module 1016 can be provided. The various modules 1012-1016 may, in some examples, be implemented as part of a coexistence manager such as the C×M 640 of FIG. 6. The various modules 1012-1016 and others may be configured to implement the embodiments discussed herein.

Offered is a method to detect the presence of a bursty interference source to a radio access technology (RAT), such as LTE, and to trigger an indication to a coexistence manager to manage the bursty interference based on the detection.

Transmissions from ISM radios, such as WiFi and Bluetooth in the ISM band can cause bursty interference to LTE in Band 40. In particular, the burst size could have a wide range from tens of microseconds (μs) to a few milliseconds (ms). With short bursts, the interference could partially overlap with the LTE subframe.

In LTE, downlink measurements may be based on measurements such as the reference signal received power (RSRP) which measures the received signal strength from a serving cell, received signal strength indicator (RSSI) which may include interference from neighboring non-serving cells, and reference signal received quality (RSRQ), which is a ratio of the RSRP and total RSSI (i.e., a measurement of the ratio of signal to interference). RSRP, RSSI, and RSRQ are typically calculated based on the common reference signal (CRS). In the presence of non-bursty interference, these measurements work well. Bursty interference, however, may cause these measurements to inaccurately report interference to a UE.

For example, the CRSs could be transmitted on orthogonal frequency-division multiplexing (OFDM) symbols 0, 4, 7, and 11 of the LTE subframe. Each OFDM symbol is approximately 71 µs long. If the bursty interference caused by an ISM RAT does not overlap with the CRS, or partially overlaps with only some of the symbols carrying CRS, the measured interference to the LTE signal will be less than the actual interference, which is experienced on OFDM symbols other than the CRS. This will result in an underestimation of actual interference and may not result in a UE triggering a coexistence indication to a coexistence manager (so that the coexistence manager may take action to reduce the impact of the interference), even if such an indication may otherwise be called for.

Offered is a method for accounting for such bursty interference in a manner that allows a coexistence manager to take corrective action. Measurements may be performed over all symbols in the subframe, not only those symbols carrying the CRS. In particular, the UE can measure RSSI on all OFDM symbols to capture the total interference from the ISM RAT.

Changing an RSSI measurement from only CRS symbols to all OFDM symbols, however, may result in underestimating interference from non-serving neighbor cells when these cells are partially loaded. This underestimation will occur when there is no interference from an ISM RAT, but neighbor cells are only transmitting pilot signals on CRS symbols. In this case, the CRS symbols will see more interference than other symbols, but the energy from that interference under the modified RSSI measurement will be averaged over all symbols. To solve this problem, the UE may use all the OFDM symbols in measuring RSSI only on subframes in which ISM interference is known to be present. To perform such adjustment of what symbols to incorporate into the RSSI measurement, the UE should have knowledge of the timing of the bursty ISM interference.

In another aspect, the UE may track RSSI variations across symbols to identify the presence of bursty ISM interference that may present itself with significant variation in RSSI across symbols. The size of the RSSI variation caused by ISM interference may be measured by the UE for purposes of triggering an indication to a coexistence manager. Calculating the ISM interference may also be aided by timing information from the coexistence manager. For example, the timing of ISM traffic bursts may be sent from the ISM radio (such as a WLAN radio) to the central coexistence manager. This timing information may also serve as a trigger for an indication to take potentially corrective coexistence measures.

To trigger the coexistence indication, the UE may evaluate the LTE performance with and without ISM interference. For example, the UE may evaluate LTE downlink signal-to-interference plus noise ratio (SINR), RSSI, interference level, downlink decoding error rate, channel quality index (CQI), throughput, spectral efficiency and/or other metrics of the LTE link quality both when the ISM radio is operating and when it is quiet. The UE may also measure the ISM traffic pattern and duty cycle to evaluate LTE performance with and without ISM interference. If the UE has difficulty measuring LTE performance without ISM interference (such as when an ISM radio has a duty cycle of 100%, i.e., is always operational), the ISM radio may be temporarily blanked for a period of time to ensure proper measurement of metrics without ISM. If ISM interference is determined to be over a certain strength or threshold (e.g., length threshold), the UE may trigger the coexistence indication. The threshold may also depend on characteristics of an expected improvement associated with a coexistence solution provided by the eNodeB. For example, if the eNodeB is expected to provide a time division multiplex solution between LTE and ISM with 50% of resources for each, then the UE may trigger the coexistence indication only if the performance with ISM interference is more than 50% worse than the performance without ISM interference.

Traditionally, an eNodeB indicates to a UE what measurements of an incoming signal should be taken for reporting purposes. In one aspect, the UE may autonomously schedule signal measurement to determine the presence of bursty interference. Scheduling by either the eNodeB or UE may be employed.

Also offered is a method of enhancing decoder performance in the presence of bursty interference. Traditionally, when a UE performs channel/interference estimation for an LTE signal, the LTE RAT may assume that measured interference is caused by a non-serving eNodeB. Such non-serving cell interference is typically not bursty (i.e., such interference is experienced over an entire subframe). In the presence of bursty interference, modifications to channel/interference estimation will improve performance. Offered are techniques to enhance channel estimation and interference covariance matrix estimation for reduction of interference.

For example, if a UE uses all OFDM symbols for the covariance matrix estimation in the presence of bursty interference (i.e., interference which only effects certain OFDM symbols), a mismatch may result between the estimated covariance matrix and the actual interference signature seen on a given OFDM symbol. To avoid this problem, the interference covariance matrix estimation may be calculated on a per OFDM symbol. If the timing of the ISM interference is known, the interference covariance matrix estimation may be calculated for subframes that suffer from ISM interference.

A similar approach may be applied for channel estimation. For example, channel estimation filtering may give a lower weight to OFDM symbols that suffer from interference as those estimates may be less reliable due to the bursty interference.

In certain communication scenarios beyond coexistence determinations, a UE may desire to perform signal measurement (for example, of RSSI) over all symbols in a subframe. In heterogeneous networks, where various power classes of base stations (such as high power macro base stations and low power pico base stations) may exist in a network, a mobile station may measure RSSI over all symbols in a subframe. Such measuring, however, occurs over all symbols on statically configured subframes among eNodeBs of the same radio access technology. In such a situation, pilot measurements may be higher than non-pilot measurements during almost-blank subframes (ABS), which may only transmit pilot signals. Non-pilot measurements by a UE may provide a better sample to judge a pico RSSI than pilot power measurements (which have higher channel power than non-pilot measurements). Thus, in heterogeneous networks, a UE may measure over all symbols to enable a good non-pilot measurement.

In a partial loading scenario, when specific base stations may not serve a full capacity of UEs, certain subframes may contain only pilot signals. When a UE attempts to measure non-pilot signals under such conditions, those signals may be unused, giving the UE an indication of low RSSI. However, this measurement may not be a correct indication of signal strength when the signals are in use. Such partial loading may lead to higher signal measurements for pilot signals than for non-pilot signals. To compensate, a UE may measure over all symbols and may average the power over both pilot and non-pilot signals to determine how loaded the network is, for purposes of choosing a network to access.

In the present disclosure, measurement of RSSI over all symbols allows detection of variations of interference over time, thus allowing identification of bursty interference, which may then trigger a coexistence indication. Further, measuring RSSI over all symbols allows a UE to distinguish between pilot and non-pilot measurements over sub-frames. Unless an interference burst overlaps exactly with the pilots for all subframes used during the measurement (which is unlikely) pilot and non-pilot measurements are likely to be comparable when detecting bursty interference, which is untrue in a heterogeneous network signal-measurement scenario. A distinction between pilot, non-pilot, and symbol measurements may help when classifying between a heterogeneous network, partial loading, and bursty interference scenarios.

Figure 11:
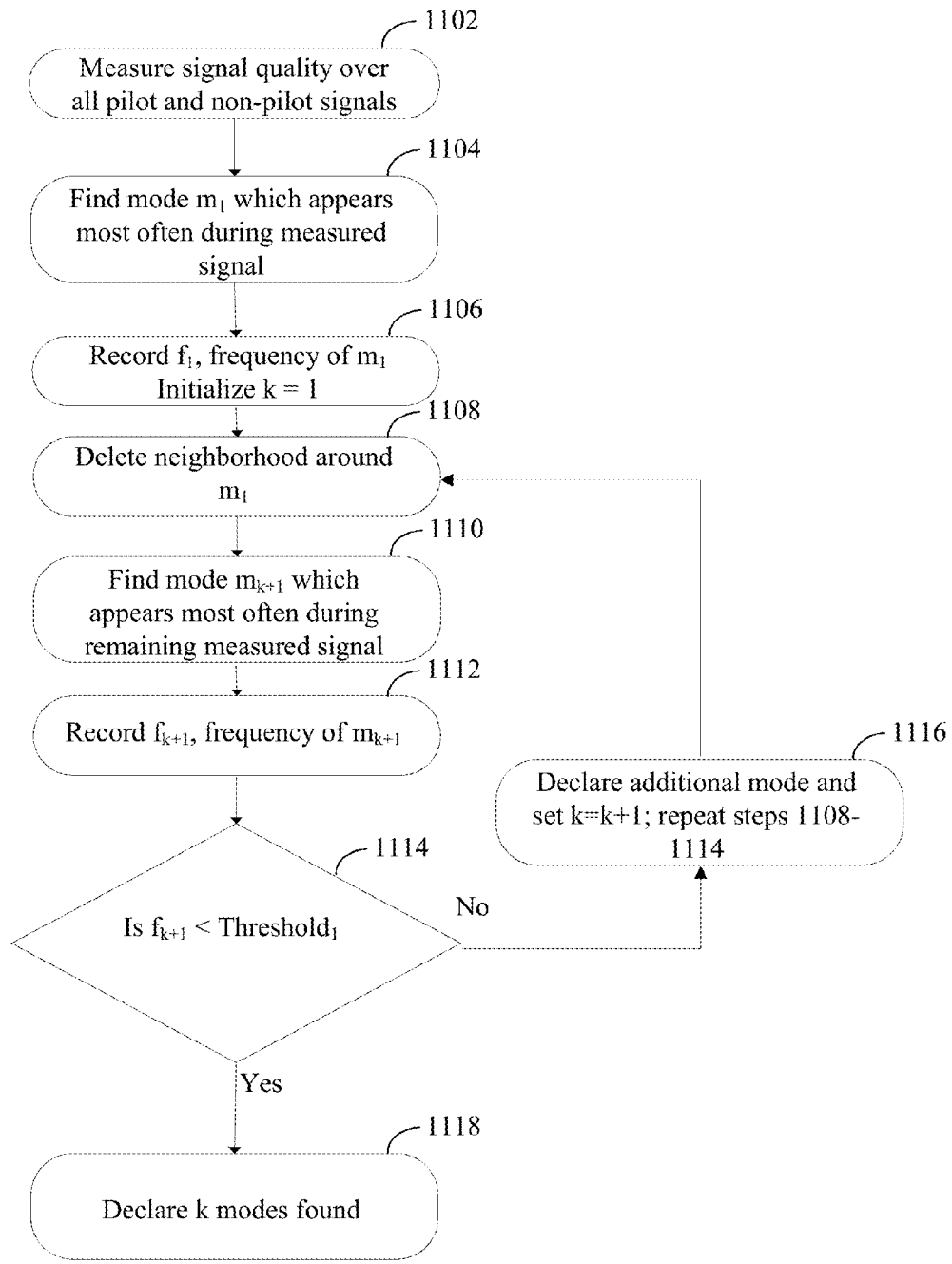
FIG. 11 illustrates multi-mode detection according to one aspect of the present disclosure.

In one aspect, a UE may determine whether a distribution of signal measurement is multi-modal through the following steps, as shown in FIG. 11. As shown in block 1102, first a UE may measure a signal quality of all pilot and non-pilot signals. Signal quality may be measured using RSSI, CQI, SINR, or other suitable metrics. The measurement sequence may be grouped in a vector $X_n$ where $X_n=\{x_1, x_2, x_3 \ldots x_n\}$ where $x_n$ is the measured signal value at time n.

Next, as shown in block 1104, the UE determines a first mode value $m_1$ in the set $X_n$ which appears most often during the measured signal sequence. As noted above, the signals are classified based on the vector Xn which may correspond to RSSI, CQI, SINR or some other suitable metric. Determining $m_1$ may be performed by grouping like portions of the measured signal sequence into bins and identifying the bin with the most portions.

As shown in block 1106, the frequency of $m_1$ (i.e., the number of times $m_1$ appears in the measured signal sequence) is recorded as $f_1$. Also, in block 1106 the value of k (discussed below) is initialized to 1. As shown in block 1108, the UE then deletes a portion of the measured sequence neighboring $m_1$. The size of the neighborhood window may vary according to a number of factors, including the measured sequence length, strength of $m_1$, etc.

As shown in block 1110, the UE then finds the next most frequent mode, $m_{k+1}$, which occurs most often during the remaining portions of the measured signal sequence after the neighborhood removal of block 1108. Next the UE records $f_{k+1}$, the frequency of $m_{k+1}$ (i.e., number of times $m_{k+1}$ appears in the measured signal sequence), as shown in block 1112.

As shown in block 1114, $f_{k+1}$ is then compared with a threshold, $Threshold_1$. $Threshold_1$ is chosen as a frequency level at which appearance of a mode is sufficient to consider the mode valid in determining a multi-mode signal. If $f_{k+1}<Threshold_1$, then k modes are declared, and the process stops, as shown in block 1118. If, however, $f_{k+1}$ is not less than $Threshold_1$, an additional mode is declared and k is incremented to evaluate the next potential mode, as shown in block 1116. The process of blocks 1108-1114 then repeats, where the neighborhood around $m_{k+1}$ is removed, a next mode is identified and its frequency $f_{k+2}$ recorded. That frequency $f_{k+2}$ is then compared against $Threshold_1$. If $f_{k+2}$ is less than $Threshold_1$, k+2 modes are declared and the process ends. If not, the process continues, etc. until a frequency is found to be less than $Threshold_1$, in other words $f_{n+1}<Threshold_1$.

$Threshold_1$ may be fixed, may be a function of $f_1$, or may be determined in another manner. For example, $Threshold_1$ may be determined to be some percentage of $f_1$, or may be determined adaptively. In one aspect, the triggering of a coexistence indication may be based on the number of modes that exceed $Threshold_1$. In another aspect, the triggering of a coexistence indication may be based at least in part on the individual mode frequencies, or the distance between them.

The processes described above and in FIG. 11 may be sufficient to determine whether a signal is multi-modal. A further process may be added, however, to determine the relative strengths of the modes to determine if they should be considered in further processing. For example, a mode may appear frequently in a measured signal sequence, and therefore may be identified in the processes of FIG. 11. If its signal quality (measured by, for example, RSSI) is relatively low, that mode may be less important in subsequent processing.

To remove such modes, a UE may compare mode metrics as described below. A UE may calculate a distance d between metrics. In one aspect, the distance d between modes i and j may be expressed as $d_{ij}=|m_i-m_j|$ for i,j=1, 2 . . . n, where n is the number of modes found in the processes of FIG. 11. The distance value d may be determined by directly comparing mode metrics such as signal quality metric RSSI or other values. In another aspect, the distance d between modes i and j may be expressed as $d_{ij}=\log(m_i/m_j)$ where d may represent the difference of spectral efficiency, a measure of compared CQI, etc. Other values or calculations of d may be used.

Based on the various comparisons of distance, and the number of modes, the UE may decide if the signal measurement is a multi-modal distribution. For example, if the largest distance between two modes is above a threshold value (i.e., $\max(d_{ij})>Threshold_2$), the signal may be recognized as multi-modal. $Threshold_2$ may be chosen according to various methods.

The processes of comparing the distance between modes may be avoided for simplicity, or if the frequency determinations of FIG. 11 are deemed to be sufficient, for example when two modes are sufficiently apart based on neighborhood window calculations.

Based on certain statistics of the signal measurements, a UE may identify a radio access technology (RAT) type of an interferer by analyzing a size of an interference burst received during the analyzed signal portion. Sufficiently granular measurements may determine that certain interference bursts happen in different time sizes. Those sizes may be used to identify a RAT. For example, if the interference bursts are hundreds of microseconds in length, the interferer may be WLAN or Bluetooth; if the interference appears in 1 ms bursts, LTE may be the interferer, etc.

The distributions of the measured signal sequence discussed above may be analyzed on different time scales to identify long-term versus short-term bursty interference. For example, depending on the potential interfering RAT (such as LTE, WLAN, Bluetooth, etc.), the time scale may be selected in an attempt to isolate potential interference from that RAT. For example, a shorter time scale may be selected for WLAN, which has short communication bursts, whereas a longer time scale may be selected for LTE, which has longer communication bursts. Multiple time scales may also be selected, which may be useful for various reasons, including when there are potentially multiple interfering RATs. The distributions may also be classified into measurements over pilot or non-pilot symbols.

Similarly, the measured signal sequence may be divided in the frequency domain and divided into sub-bands where measurements may be tracked in both time and number of occurrences. Dividing the signal in the frequency domain may assist in detecting interference from an adjacent channel as the power spectral density of interference over the desired channel may be frequency selective. In this manner, a UE may determine if interference is in an adjacent channel, and may identify that information in an coexistence trigger to a coexistence manager.

For in-device interference (i.e., one radio on a UE interfering with operations of another radio on the UE), the interference timing may be known. For example, the coexistence manager may be aware of the communication activities of all in-device radios and therefore the timing of in-device interference may be known and/or predicted. In this case, the signal measurement may be divided into measurements when the in-device interference is on and when the in-device interference is off. Further divisions may categorize the specific interference RAT. For example, one bin may include LTE operations without interference, another bin may include LTE operations with known Bluetooth interference, and another bin may include LTE operations with known WLAN interference. In another example, one bin may include WLAN operation with no interference, another bin may include WLAN operation with LTE interference, etc.

In another aspect, a UE may not know the RAT causing the interference, but may analyze a distribution of interference and how it varies over time to detect potential patterns in the interference. For example, a UE may analyze a value of a mode of interference, how often the mode occurs, the length of the interference burst, and the distribution of length of the burst. Once high interference is identified, the UE may count the time intervals of such high interference, as well as the inter-arrival time between the bursts, to attempt to detect a pattern. A detected pattern, or the individual metrics themselves, may be analyzed to attempt to match the interference to one or more particular RATs.

To avoid a false alarm, that is to avoid incorrectly determining a multi-modal signal distribution, certain precautions may be taken. A false alarm may occur in the presence of fast fading, when the amplitude of the channel varies considerably in a short period of time. In one aspect, to reduce the chance of a false alarm due to fast fading, the multimodal distribution may be analyzed over a sufficiently long window such that fluctuations due to fast fading appear as a single mode. Further, the window to analyze the multimodal distribution may be set to be less than the shadowing (slow fading) coherence time such that average path loss distribution is fixed. In another aspect, when interference timing is known (such as in the case of in-device interference described above), threshold interference detectors may be adjusted for periods when other in-device RAT activity is not expected.

Figure 12:
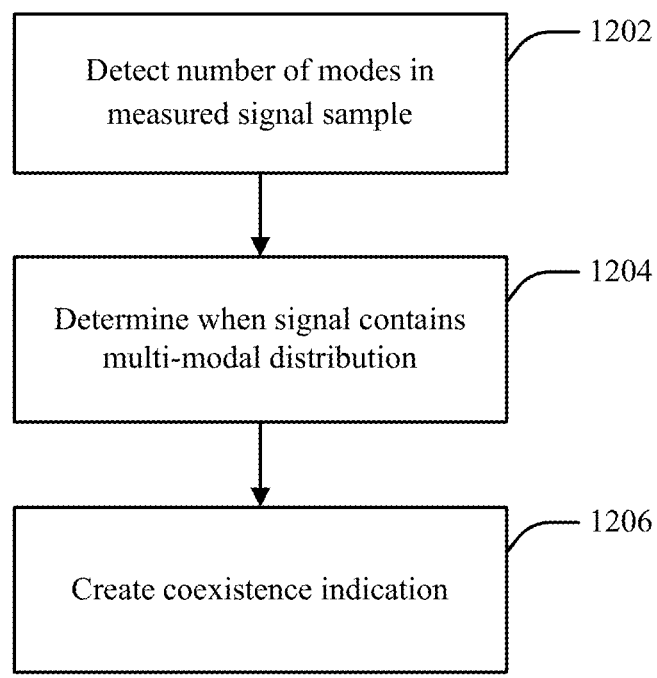
FIG. 12 is a block diagram illustrating multi-radio coexistence management according to one aspect of the present disclosure.

As shown in FIG. 12 a UE may detect a number of modes in a measured signal sample, as shown in block 1202. A UE may determine when a signal contains a multi-modal distribution based at least in part on the detecting, as shown in block 1204. A UE may create a coexistence indication based at least in part on the determining, as shown in block 1206.

Figure 13:
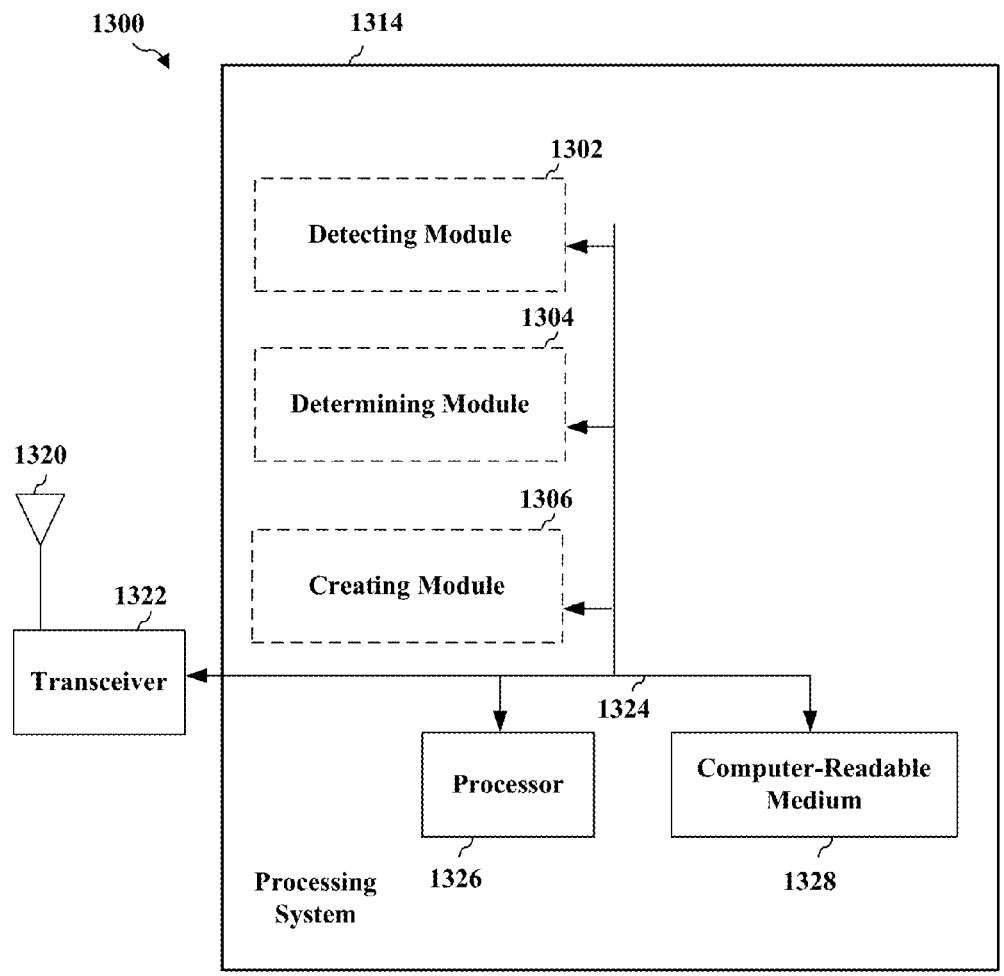
FIG. 13 is a block diagram illustrating a processor system for multi-radio coexistence management according to one aspect of the present disclosure.

FIG. 13 is a diagram illustrating an example of a hardware implementation for an apparatus 1300 employing a processing system 1314. The processing system 1314 may be implemented with a bus architecture, represented generally by a bus 1324. The bus 1324 may include any number of interconnecting buses and bridges depending on the specific application of the processing system 1314 and the overall design constraints. The bus 1324 links together various circuits including one or more processors and/or hardware modules, represented by a processor 1326, a detecting module 1302, a determining module 1304 and a creating module 1306, and a computer-readable medium 1328. The bus 1324 may also link various other circuits such as timing sources, peripherals, voltage regulators, and power management circuits, which are well known in the art, and therefore, will not be described any further.

The apparatus includes the processing system 1314 coupled to a transceiver 1322. The transceiver 1322 is coupled to one or more antennas 1320. The transceiver 1322 provides a means for communicating with various other apparatus over a transmission medium. The processing system 1314 includes the processor 1326 coupled to the computer-readable medium 1328. The processor 1326 is responsible for general processing, including the execution of software stored on the computer-readable medium 1328. The software, when executed by the processor 1326, causes the processing system 1314 to perform the various functions described supra for any particular apparatus. The computer-readable medium 1328 may also be used for storing data that is manipulated by the processor 1326 when executing software. The processing system 1314 further includes the detecting module 1302 for detecting a number of modes in a measured signal sample. The processing system 1314 further includes the determining module 1304 for determining when a signal contains a multi-modal distribution based at least in part on the detecting. The processing system 1314 further includes the creating module 1306 for creating a coexistence indication based at least in part on the determining. The detecting module 1302, the determining module 1304 and the creating module 1306 may be software modules running in the processor 1326, resident/stored in the computer readable medium 1328, one or more hardware modules coupled to the processor 1326, or some combination thereof. The processing system 1314 may be a component of the UE 250 and may include the memory 272 and/or the processor 270.

In one configuration, the apparatus 1300 for wireless communication includes means for detecting. The means may be the detecting module 1302, the coexistence manager 640, the memory 272, the processor 270/1326, the computer-readable medium 1328, the antennae 252/1320, the receiver 254, the transceiver 1322, and/or the processing system 1314 of the apparatus 1300 configured to perform the functions recited by the means. In another aspect, the aforementioned means may be any module or any apparatus configured to perform the functions recited by the aforementioned means.

In one configuration, the apparatus 1300 for wireless communication includes means for determining and means for creating. The means may be the determining module 1304, the creating module 1306, the coexistence manager 640, the memory 272, the processor 270/1326, the computer-readable medium 1328, and/or the processing system 1314 of the apparatus 1300 configured to perform the functions recited by the means. In another aspect, the aforementioned means may be any module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
   detecting a number of modes in a measured signal sample, in which each mode corresponds to a frequency;
   determining when a signal contains a multi-modal distribution based at least in part on the detecting and based at least in part on whether at least one of the frequencies of the modes meets a threshold value; and
   creating a coexistence indication based at least in part on the determining.

2. The method of claim 1, in which the detecting comprises:
   identifying a first mode in the measured signal sample;
   determining a first frequency of appearance of the first mode in the measured signal sample;
   identifying a second mode in a portion of the measured signal sample; and
   determining a second frequency of appearance of the second mode in the portion of the measured signal sample; and
   in which determining when the signal contains the multi-modal distribution is based at least in part on the second frequency of appearance being above a threshold value.

3. The method of claim 2, in which the threshold value is based at least in part on the first frequency of appearance.

4. The method of claim 2, in which the creating the coexistence indication is further based at least in part on the first frequency of appearance and/or the second frequency of appearance.

5. The method of claim 2, in which determining when the signal contains the multi-modal distribution is based at least in part on metric values of the first mode and the second mode differing by at least a second threshold value.

6. The method of claim 5, in which the metric values comprise signal quality values.

7. The method of claim 1, further comprising transmitting a coexistence message to a serving base station, the coexistence message comprising the coexistence indication.

8. The method of claim 7, in which the coexistence message further comprises at least one of a measured number of modes in the measured signal sample, signal strength of an interfering radio access technology (RAT), duty cycle of the interfering RAT, or type of the interfering RAT.

9. The method of claim 1, further comprising identifying an interfering radio access technology (RAT) based at least in part on the measured signal sample.

10. The method of claim 1, in which the interfering RAT is identified based at least in part on at least one of an interfering burst length, duty cycle, or other time or frequency features of the interfering RAT.

11. The method of claim 1, in which creating the coexistence indication is further based at least in part on simultaneous operation of a plurality of in-device radio access technologies (RATs).

12. The method of claim 1, in which the signal sample is measured over pilot and non-pilot symbols.

13. An apparatus for wireless communication, comprising:
   means for detecting a number of modes in a measured signal sample, in which each mode corresponds to a frequency;
   means for determining when a signal contains a multi-modal distribution based at least in part on the detecting and based at least in part on whether at least one of the frequencies of the modes meets a threshold value; and means for creating a coexistence indication based at least in part on the determining.

14. The apparatus of claim 13, in which the means for detecting comprises:
    means for identifying a first mode in the measured signal sample;
    means for determining a first frequency of appearance of the first mode in the measured signal sample;
    means for identifying a second mode in a portion of the measured signal sample; and
    means for determining a second frequency of appearance of the second mode in the portion of the measured signal sample; and
    in which the means for determining when the signal contains the multi-modal distribution is based at least in part on the second frequency of appearance being above a threshold value.

15. A computer program product for wireless communications in a wireless network, comprising:
    a non-transitory computer-readable medium having program code recorded thereon, the program code comprising:
        program code to detect a number of modes in a measured signal sample, in which each mode corresponds to a frequency;
        program code to determine when a signal contains a multi-modal distribution based at least in part on the detecting and based at least in part on whether at least one of the frequencies of the modes meets a threshold value; and
        program code to create a coexistence indication based at least in part on the determining.

16. The computer program product of claim 15, in which the program code to detect comprises:
    program code to identify a first mode in the measured signal sample;
    program code to determine a first frequency of appearance of the first mode in the measured signal sample;
    program code to identify a second mode in a portion of the measured signal sample; and
    program code to determine a second frequency of appearance of the second mode in the portion of the measured signal sample; and
    in which the program code to determine when the signal contains the multi-modal distribution is based at least in part on the second frequency of appearance being above a threshold value.

17. An apparatus for wireless communication, comprising:
    a memory; and
    at least one processor coupled to the memory and configured:
        to detect a number of modes in a measured signal sample, in which each mode corresponds to a frequency;
        to determine when a signal contains a multi-modal distribution based at least in part on the detecting and based on whether at least one of the frequencies of the modes meets a threshold value; and
        to create a coexistence indication based at least in part on the determining.

18. The apparatus of claim 17, in which the program code to detect comprises:
    to identify a first mode in the measured signal sample;
    to determine a first frequency of appearance of the first mode in the measured signal sample;
    to identify a second mode in a portion of the measured signal sample; and
    to determine a second frequency of appearance of the second mode in the portion of the measured signal sample; and
    in which the at least one processor configured to determine when the signal contains the multi-modal distribution is based at least in part on the second frequency of appearance being above a threshold value.

19. The apparatus of claim 18, in which the threshold value is based at least in part on the first frequency of appearance.

20. The apparatus of claim 18, in which the at least one processor configured to create the coexistence indication is further based at least in part on the first frequency of appearance and/or the second frequency of appearance.

21. The apparatus of claim 18, in which the at least one processor configured to determine when the signal contains the multi-modal distribution is based at least in part on metric values of the first mode and the second mode differing by at least a second threshold value.

22. The apparatus of claim 21, in which the metric values comprise signal quality values.

23. The apparatus of claim 18, in which the at least one processor is further configured to transmit a coexistence message to a serving base station, the coexistence message comprising the coexistence indication.

24. The apparatus of claim 23, in which the coexistence message further comprises at least one of a measured number of modes in the measured signal sample, signal strength of an interfering radio access technology (RAT), duty cycle of the interfering RAT, or type of the interfering RAT.

25. The apparatus of claim 18, in which the at least one processor is further configured to identify an interfering radio access technology (RAT) based at least in part on the measured signal sample.

26. The apparatus of claim 18, in which the interfering RAT is identified based at least in part on at least one of an interfering burst length, duty cycle, or other time or frequency features of the interfering RAT.

27. The apparatus of claim 18, in which creating the coexistence indication is further based at least in part on simultaneous operation of a plurality of in-device radio access technologies (RATs).

28. The apparatus of claim 18, in which the signal sample is measured over pilot and non-pilot symbols.

* * * * *